3,160,012
FAIL SAFE AIRCRAFT INSTRUMENT
John H. Andresen, Jr., Forest Knolls, Greenwood Lake, N.Y., assignor to Kollsman Instrument Corporation, Elmhurst, N.Y., a corporation of New York
Filed Nov. 17, 1960, Ser. No. 70,041
5 Claims. (Cl. 73—384)

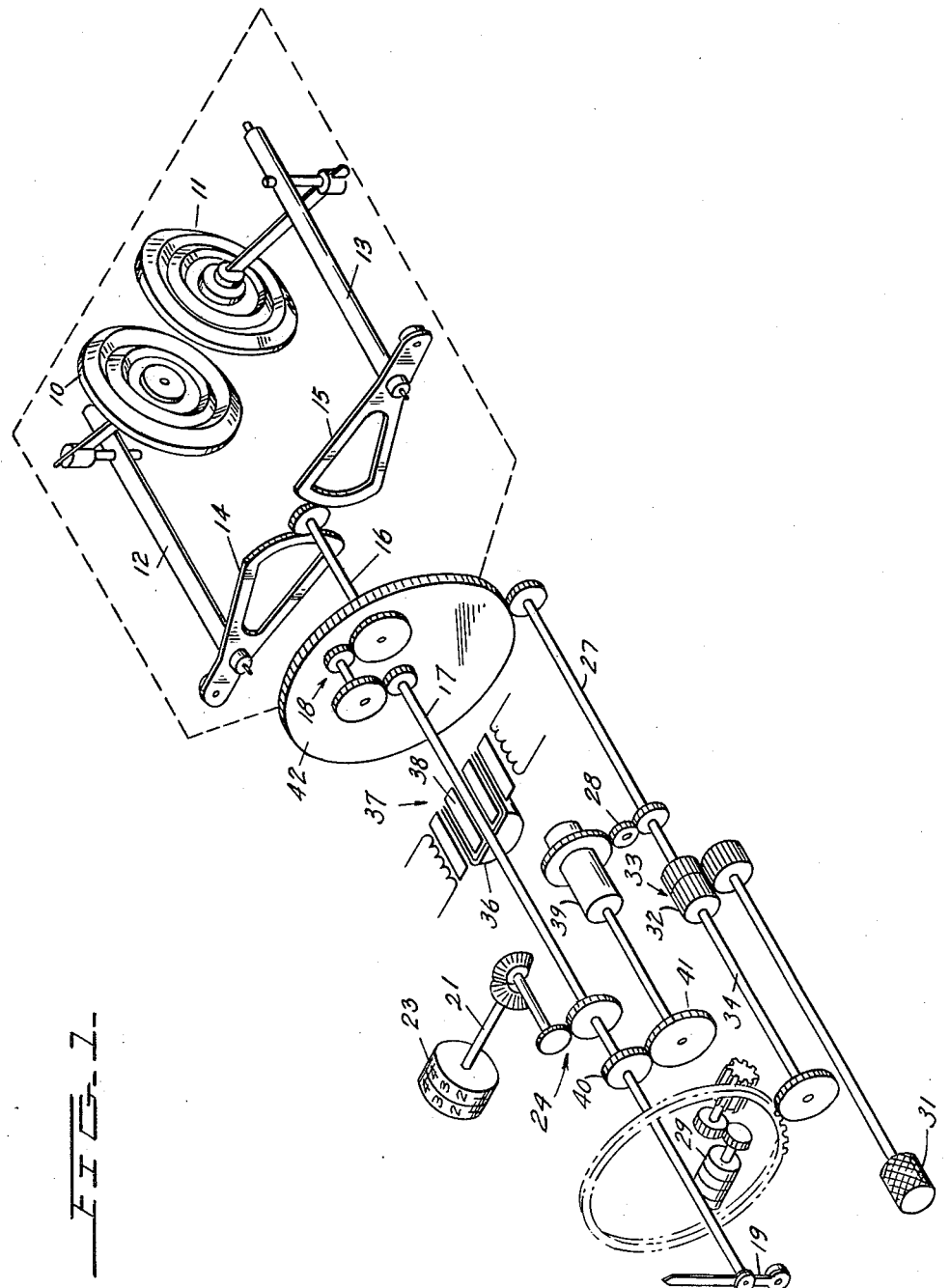

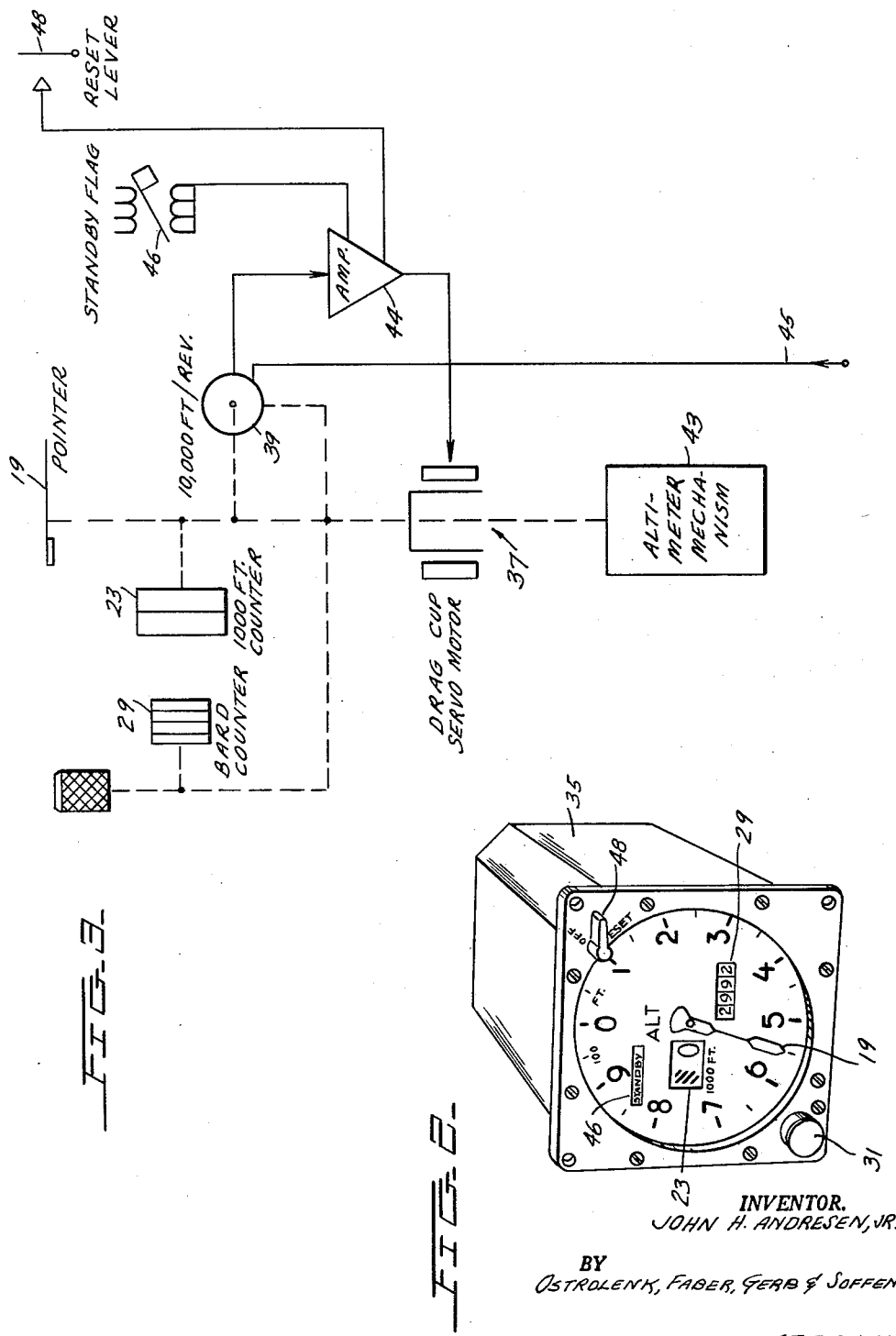

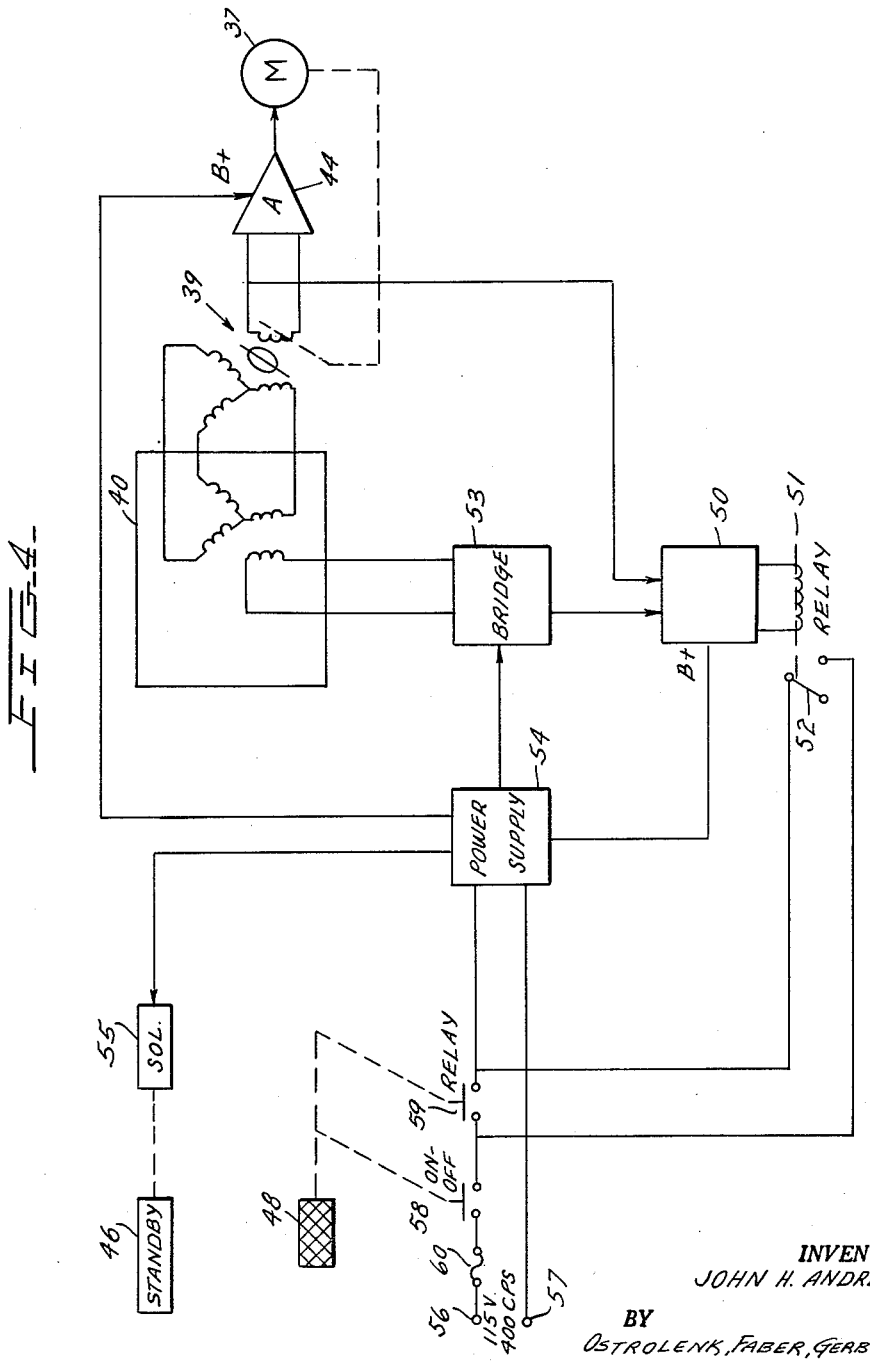

This invention relates to an aircraft instrument wherein an indicating pointer is driven either directly by a pressure actuated mechanism or electrically by a servo from a remote source of information wherein the instrument reverts to its direct pressure actuation mode of operation responsive to a failure in electrical power.

Fail-safe types of electrical instruments are known to the art and are shown, for example, in copending applications, Serial No. 612,780, filed September 28, 1956 in the name of James W. Angus now U.S. Patent No. 3,009,358 and Serial No. 614,670 filed October 8, 1956 in the name of John H. Andresen, Jr. now U.S. Patent No. 3,009,357.

In each of the above two applications, a controlling system is provided wherein the altimeter's pressure actuated mechanism as a whole is rotated by an electrical servo mechanism by the amount necessary to correct any errors in the pointer indication of the pressure actuated mechanism.

In the present invention, when the servo is activated, it positions the pointer in accordance with an entirely separate, remote source of information rather than supplying a correction to the information in the pressure actuated mechanism in the instrument as do the above inventions.

The essence of the present invention is to provide a novel structure whereby an instrument pointer shaft may be directly driven according to a parameter which is electrically transmitted to the instrument and, responsive to a failure thereof, the instrument reverts to its direct pressure actuating mode of operation.

The transmitted parameter, which by way of example will be assumed to be in the form of a synchro shaft position, could be pressure altitude as driven from an air date computer or other suitable transmitter, or could be radar altitude as derived from a radar altitude system. A signal representative of the difference between transmitted electrical parameter and the position of the pointer is amplified and applied to drive the rotor of a drag cup motor which is directly secured to the pointer shaft until the shaft position agrees with the transmitted electrical parameter. Thus, the pointer shaft is driven in accordance with the accurately measured parameter in the transmitter. In order to compare the pointer position with the synchro position signal of the transmitter, a synchro control transformer is then secured to the pointer shaft which provides the error signal to the input servo system driving the drag cup. Accordingly, the pointer shaft of the instrument will be accurately positioned by the electrical system independently of the instrument pressure sensing components. In doing so it must overcome by force the pressure sensing mechanism in the indicator.

In a typical embodiment of the invention, the rotor of the synchro-control transformer and the rotor of the drag cut motor, which are added to a standard pressure operated instrument, will have a relatively insignificant weight of the order of 1.4 grams and will have very low friction jewelled bearings. Thus, the electrical operating elements will not substantially interfere with the normal operating mode of the instrument by its pressure sensing elements when the electrical system is rendered inoperative by an electrical failure or by an intentional operation of the pilot.

Accordingly, a primary object of this invention is to provide a novel fail-safe aircraft instrument wherein a minimum of equipment is added to a normal pressure-operated instrument for achieving electrical operation of the instrument actuation from a separate, remote source.

Another object of this invention is to provide a novel fail-safe instrument for aircraft which is electrically operated and comprises a standard type of instrument modified by relatively low mass components.

Another object of this invention is to provide a novel aircraft instrument wherein the pressure reading of the pointer of the instrument may be substituted by an electrically transmitted input function which drives a drag cup motor having a rotor which is operatively connected to the pointer shaft.

These and other objects of this invention will become apparent from the following description when taken in connection with the drawings in which:

FIGURE 1 shows a perspective diagram of a standard type of altimeter which is modified in accordance with the present invention.

FIGURE 2 shows the instrument of FIGURE 1 contained within a housing and illustrates the counter-pointer type of indication given by the instrument.

FIGURE 3 is a functional diagram of the instrument of FIGURES 1 and 2.

FIGURE 4 is a schematical electrical diagram of the circuitry associated with the instrument of FIGURES 1 and 2.

Referring first to FIGURE 1, the instrument is comprised of a standard type of altimeter which comprises a dual aneroid system including diaphragms 10 and 11 which expand and contract responsive to predetermined pressures applied thereto. The output of diaphragms 10 and 11 is caused to rotate shafts 12 and 13, respectively, which are fixed to gear sectors 14 and 15, respectively. Gear sectors 14 and 15 drive shaft 16 which is connected to shaft 17 through the gear train 18. Shaft 17 is then directly connected to pointer 19 which sweeps across the instrument face 20 as shown in FIGURE 2.

More specifically, one complete rotation of pointer 19 may correspond to an altitude change of 1,000 feet. Shaft 17 is also connected to shaft 21 of the altitude drum type counter 23 through gear train 24 where the drum which is visible through window 25 of FIGURE 2 indicates feet in increments of 1,000.

In order to preset the instrument for predetermined barometric conditions, knob 31 is turned. This rotates, through suitable gearing, the whole aneroid mechanism which is attached to gear 42, the barometric counter 29, and the stator of a synchro control transformer 39.

In accordance with the present invention, the aforementioned standard type of pressure actuated altimeter is modified so that pointer 19 may be positioned in accordance with a predetermined measured parameter. Thus in FIGURE 1, the shaft 17 has a drag cup 36 of a drag cup motor 37 secured thereto so that the motor torque of the drag cup motor will apply torque to position pointer 19 in defiance to the torque produced by diaphragms 10 and 11. It will be noted that when electrical operation is elected, the repositioning of shaft 17 by the torque of motor 37 will act as a biasing force against which the motor action operates. The rotor 38 of the drag cup motor 37 may be of aluminum and is mounted directly on the pointer shaft, its mass being of the order of 0.7 gram.

In order to actuate motor 37 from a servo system, a synchro control transformer 39 has its rotor geared to shaft 17 through gears 40 and 41. In a preferred embodiment, the rotor of the synchro 39 has a weight of the order of ¾ of a gram and has no friction producing brushes. The gear train connecting the rotor of synchro 39 to shaft 17 is preferably such that the rotor will turn through 360° for a 10,000 foot change in altitude.

The stator housing of the synchro transmitter 39 is then geared to shaft 27 through gear train 28 and is rotated by the barometric setting counter drive, as previously indicated.

Accordingly, through the addition of the rotor of synchro 39 and the rotor 38 of motor 37, means are provided whereby the instrument indication may be accurately electrically established. A typical servo system for effectuating this drive is set forth in FIGURE 3 in functional form. Referring now to FIGURE 3, the complete mechanism for driving pointer 19 is illustrated as mechanism 43, the dotted lines of the diagram of FIGURE 3 indicating a mechanical connection between the components. The pointer shaft is then operatively connected to the 1000 feet counter 23, as illustrated in FIGURE 1, while the mechanical connection between altimeter mechanism 43 and pointer 19 has the rotor of a drag cup servo motor 37 associated therewith. Additionally, the rotor of a synchro 39 is mechanically associated with pointer 19.

The synchro control circuit includes, as shown in FIGURE 3, an amplifier 44 of any desired type carried within the housing 35 of FIGURE 2 if desired.

In operation, an output signal developed from a remote measuring means is connected to line 45. The difference between this signal and the signal generated by synchro 39 is an error signal which is applied to amplifier 44. That is to say, when the position of pointer 19, as determined by the output of synchro 39, is different from the remote signal, an error signal will be delivered to amplifier 44. The amplifier 44 then energizes the drag cup servo motor 37 so that the speed of rotation thereof depends upon the magnitude of the error signal, while the direction of rotation of motor 37 depends upon the sense of the error sginal. When the error signal is brought to zero, the pointer indication will be that of the remote transmitter.

In the event of a power failure or electrical malfunction, wherein the servo becomes inoperative, the motor 37 is deenergized, as will be seen more fully hereinafter, and the altimeter immediately returns to its diaphragm actuated indication. The removal of power from the amplifier 44 causes the operation of a standby flag 46 of FIGURES 2 and 3 where FIGURE 2 shows the standby flag as being visible through a window in the dial surface. The flag operating mechanism may be of any standard type well known to those skilled in the art.

Additional switching means 48 are available to the pilot as shown in FIGURES 2 and 3, so that amplifier 44 may be intentionally deenergized to cause the altimeter to revert to its direct operation.

The electrical control circuit for the system described above is shown in FIGURE 4. Referring to FIGURE 4, the input to synchro control transformer 39 is from a remote altitude transmitter synchro 40 which is positioned in accordance with the premeasured value to be indicated by the indicating device.

The control system includes a fail-safe relay control 50 which operates a relay contact 52. The circuit of fail-safe device 50 is controlled by output currents from a bridge circuit 53 in a manner to be described hereinafter to control the power supply 54 which drives amplifier 44, a solenoid 55 and the standby flag 46.

The power supply 54 is connected to a source of power at terminals 56 and 57 through a first and second switch 58 and 59, where switch 58 is normally open while switch 59 is of the normally open type. The contact positions for switches 58 and 59 are controlled by the reset lever or switching means 48, whereby moving the reset lever 48 through a rotation of approximately 30° will permit closure of switch 58 and will cause momentary closure of switch 59.

When switches 58 and 59 are closed, power will be supplied to the instrument from power supply 54. That is to say, the power will turn on the servo amplifier 44 and the fail-safe circuit 50. When fail-safe circuit 50 is energized, relay coil 51 is energized to close relay contact 52 and, thus, short circuit momentary switch 59. Accordingly, momentary switch 59 may open when lever 48 is released, but power supply 54 will continue to be energized through contact 52. The energization of power supply 54 will also energize solenoid 55 to remove standby flag 46 from view.

The error signal from servo 39 is continuously monitored by fail-safe circuit 50. In a preferred circuit, when the servo error exceeds the equivalent of 700 feet, the relay winding 51 is deenergized to open contact 52 and disrupt the primary power to the system, so that the altimeter mechanism returns to diaphragm operation. Once the relay has been so deenergized, the servo mode of operation cannot be reinstated until the reset knob 48 is again operated by the pilot to the reset position.

A resistor means (not shown) is associated with the stator circuit of synchro control transformer 39 and is connected in a bridge circuit relation with a reference voltage developed in the power supply. Thus, if the synchro rotor does not draw normal excitation current, the bridge will become unbalanced to present an error to the fail-safe circuit 50 which again causes the instrument to go into its standby mode of operation.

In order to deenergize the circuit, lever 48 is movable to an "Off" position (FIGURE 2) which causes opening of switch 58 and thus disconnection of the power supply.

The fail-safe circuit of FIGURE 4 can specifically detect the following types of failures:

(1) A primary power supply failure will cause the operating power to fail-safe circuit 50 to be removed so that relay 51 opens, whereby the standby mode of operation is achieved and the standby flag 46 drops into view.

(2) In the event of a failure in the servo amplifier 44 or servo motor 37, once the 700 foot error is developed, the mechanism reverts to standby operation.

(3) The mechanism may also be caused to revert to standby operation at the pilot's option by rotating the reset knob 48 to the "Off" position of FIGURE 2 which causes contact 58 to open and, thus, disrupt primary power.

(4) In the event of a short circuit within the instrument which causes a high drain in the power supply current, a fuse 60 will operate to again disrupt the primary power to power supply 54.

(5) In the event of an open circuit or short circuit in the synchro excitation circuit, the bridge circuit referred to above will be unbalanced to cause operation of relay 51.

Although I have described preferred embodiments of my novel invention, many variations and modifications will now be obvious to those skilled in the art, and I prefer thereto to be limited not by the specific disclosure herein, but only by the appended claims.

I claim:

1. An indicating device for indicating a measured variable parameter; said indicating device including a movable indicator connected to a shaft; a mechanical driving means operatively connected to said shaft and an electrical driving system operatively connected to said shaft; said mechanical driving means including mechanical measuring means for determining the value of said variable parameter and positioning said shaft in accordance with its said measurement; said electrical driving system including electrical means for determining the value of said variable parameter and a servo system; said servo system including a motor rotor carried by said shaft; said electrical driving system imparting a torque to said motor rotor on said shaft whereby said indicator assumes a position determined by the measurment of said electrical means; said indicator assuming a position determined by the measurement of said mechanical measuring means when said electrical driving means is rendered inoperative; said motor rotor being a drag cup rotor having a substantially negligible mass.

2. An indicating device for indicating a measured variable parameter; said indicating device including a movable indicator connected to a shaft; a mechanical driving means operatively connected to said shaft and an electrical driving system operatively connected to said shaft; said mechanical driving means including mechanical measuring means for determining the value of said variable parameter and positioning said shaft in accordance with its said measurement; said electrical driving system including electrical means for determining the value of said variable parameter and a servo system; said servo system including a motor rotor carried by said shaft; said electrical driving system imparting a torque to said motor rotor on said shaft whereby said indicator assumes a position determined by the measurement of said electrical means; said indicator assuming a position determined by the measurement of said mechanical measuring means when said electrical driving means is rendered inoperative; said motor rotor being a drag cup motor of small mass; said servo system including a synchro rotor connected to said shaft; said synchro rotor having a small mass; the accuracy of said indicating device in the mechanically driven mode of operation being unaffected by said electrical driving system when said electrical driving system is inoperative.

3. A fail safe instrument; said fail safe instrument having a pointer shaft; said pointer shaft being directly connected to a first driving means and electromechanically connected to a second driving means; said electro-mechanical connection including a drag cup motor having its rotor directly connected to said shaft; said second driving means being operable to over-ride said first driving means when said second driving means is in operation; said pointer shaft reverting to a position given by said first driving means when said second driving means is inoperative.

4. A fail safe instrument; said fail safe instrument having a pointer shaft; said pointer shaft being directly connected to a first driving means and electro-mechanically connected to a second driving means; said electromechanical connection including a drag cup motor having its rotor directly connected to said shaft; said second driving means being operable to over-ride said first driving means when said second driving means is in operation; said pointer shaft reverting to a position given by said first driving means when said second driving means is inoperative; said second driving means including computer means for determining the position of said pointer shaft with greater accuracy than said first driving means.

5. In a pneumatically driven aircraft instrument; said aircraft instrument including an indicator shaft for moving the indicator of said instrument; an electrical computing system, and a servo system; said servo system including a drag cup motor and a synchro; the rotors of said drag cup motor and synchro being mechanically connected to said indicator shaft; said electrical computing system being operable to determine a more accurate reading of said instrument due to predetermined parameters; said electrical computing system being connected to said servo system; said servo system driving said drag cup rotor until the position of said indicator as indicated by said synchro rotor corresponds to the required value determined by said electrical computing system; said indicator returning to its pneumatically determined position when the torque on said drag cup motor rotor is zero.

References Cited in the file of this patent
UNITED STATES PATENTS 2,167,412    Baesecke _____ July 25, 1939
2,647,233    Kutzler _____ July 28, 1953

OTHER REFERENCES

A.P.C. application of Kohler et al., Serial No. 284,328, published May 4, 1943, now abandoned.